(No Model.)
J. T. FEWKES.
OIL FILTER.
No. 530,757. Patented Dec. 11, 1894.
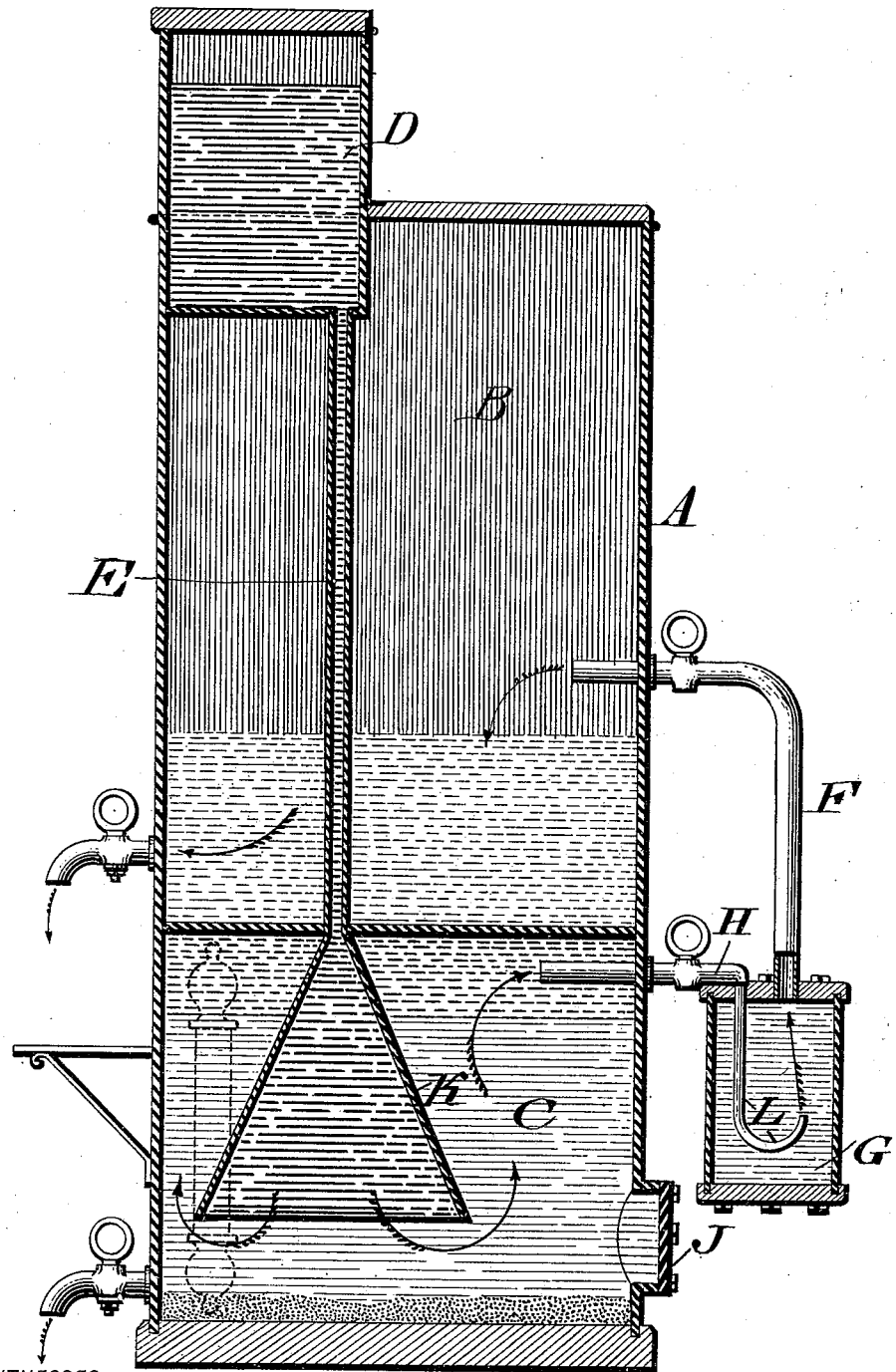
WITNESSES:
O. H. Nagle.
L. Douville.
INVENTOR
Joseph T. Fewkes
BY John A. Biedersheim
ATTORNEY.

UNITED STATES PATENT OFFICE.

JOSEPH T. FEWKES, OF PHILADELPHIA, PENNSYLVANIA, ASSIGNOR TO ELLEN H. ANDERSON, OF SAME PLACE.

OIL-FILTER.

SPECIFICATION forming part of Letters Patent No. 530,757, dated December 11, 1894.

Application filed December 16, 1892. Serial No. 455,330. (No model.)

*To all whom it may concern:*

Be it known that I, JOSEPH T. FEWKES, a citizen of the United States, residing in the city and county of Philadelphia, State of Pennsylvania, have invented a new and useful Improvement in Oil-Filters, which improvement is fully set forth in the following specification and accompanying drawing.

My invention consists of an oil filter formed of a tank having a partition therein, producing upper and lower chambers, an oil receiver in said tank, with a discharge pipe passing from or through the upper chamber, and provided with an outlet in the lower chamber, a secondary filtering vessel outside of said tank, a pipe leading from the upper part of the lower chamber, and a goose-neck in the lower part of the secondary vessel, a pipe leading from the secondary vessel to the upper chamber, and a discharge faucet for the upper chamber, the device produced being simple, compact, inexpensive and effective and admitting of having its parts readily reached for purposes of cleansing, repairs, &c.

The figure represents a vertical section of a filter embodying my invention.

Referring to the drawing:—A designates a tank having upper and lower chambers B and C. Above the chamber B is the oil receiver D, which has an outlet pipe E, the latter communicating with the chamber C.

F designates a pipe which communicates with the chamber B, and with a filtering vessel G, the latter being supported in any suitable manner.

H designates a pipe which communicates with the chamber C and the vessel G. The vessel G is below the level of the pipe H, so that there is no flow from the filtering chamber to the chamber C.

The operation is as follows:—The tank G and the chamber C are supplied with water or filtering material, to a proper height, and the oil to be filtered placed in the receiver D, said oil then flowing through the pipe E into the chamber C, where it rises slowly through the filtering material until it reaches the upper portion of said chamber, the dirt and sediment meanwhile, falling to the bottom of the same. The oil then passes out through the pipe H into the vessel G, where it undergoes a secondary filtering through the material therein. It then flows from said vessel G in filtered condition through the pipe F into the chamber B, where it is stored and from whence it may be drawn off as required. A gage is secured to the tank A, whereby the height of the oil in the chamber C may be ascertained. Cocks are provided, whereby the flow of the oil may be regulated, and the filtered oil removed, as desired. In the wall of the chamber C is a hand-hole J, whereby the sediment or deposit may be removed without disturbing the filtered oil stored in the chamber B. The lower end of the pipe E terminates in an inverted funnel or flaring outlet K, the bottom of the same opening into the chamber C, thus allowing the oil to be held in suspension, controlled by the valves or cocks of the pipes H and F, thereby permitting the precipitation of foreign matters.

The wall of the vessel G is formed of transparent material, so that the secondary filtering operation of the oil therein is visible, and may be inspected, said oil leaving the end of the pipe H drop by drop, said end being bent or turned laterally, or of the form of an inverted goose-neck, as at L, so that the discharging oil may readily rise from the same.

Having thus described my invention, what I claim as new, and desire to secure by Letters Patent, is—

An oil filter, consisting of a tank having a partition therein, forming upper and lower chambers, an oil receiver on said tank, with a discharge pipe passing through said upper chamber, and provided with an outlet in said lower chamber, a secondary filtering vessel outside of said tank, a pipe leading from the upper part of said lower chamber to a goose neck in the lower part of said secondary vessel, a pipe leading from said secondary vessel to said upper chamber, and a discharge faucet for said upper chamber, said parts being combined substantially as described.

JOSEPH T. FEWKES.

Witnesses:
JOHN A. WIEDERSHEIM,
A. P. JENNINGS.